United States Patent
Shao et al.

(10) Patent No.: US 12,265,378 B2
(45) Date of Patent: Apr. 1, 2025

(54) INDUSTRIAL INTERNET OF THINGS WITH INDEPENDENT MANAGEMENT PLATFORM AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Haitang Xiang, Chengdu (CN); Xiaojun Wei, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 480 days.

(21) Appl. No.: 17/806,502

(22) Filed: Jun. 13, 2022

(65) Prior Publication Data
US 2023/0400836 A1 Dec. 14, 2023

(51) Int. Cl.
*G05B 19/418* (2006.01)

(52) U.S. Cl.
CPC ....... *G05B 19/418* (2013.01); *G05B 19/4183* (2013.01); *G05B 19/4185* (2013.01); *G05B 19/41865* (2013.01)

(58) Field of Classification Search
CPC .............. G05B 19/418; G05B 19/4183; G05B 19/4185; G05B 19/41865; H04L 67/125; H04L 67/288; H04L 67/566
See application file for complete search history.

(56) References Cited

U.S. PATENT DOCUMENTS

| | | | |
|---|---|---|---|
| 11,586,183 B1 * | 2/2023 | Shao | G06Q 50/04 |
| 11,606,434 B1 * | 3/2023 | Shao | H04L 41/084 |
| 11,625,028 B1 * | 4/2023 | Shao | G05B 19/41865 |
| | | | 700/95 |

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Crystal J Barnes-Bullock
(74) *Attorney, Agent, or Firm* — METIS IP LLC

(57) ABSTRACT

An industrial internet of things with independent management platform and control methods thereof are provided. The service platform and sensor network platform use a centralized arrangement, and the management platform uses an independent arrangement. When the management platform receives sensing detection data transmitted by the object platform, the sensing detection data is presented to the user platform after being processed by a sub-platform. When the management platform sends a control command to the object platform, a control parameter of a type of production line stage is calculated by a corresponding sub-platform and sent to the object platform by the sub-platform. Since the centralized arrangement and the independent arrangement are used, data management and arithmetic control for the data of each production stage can be performed through different sub-platforms in the management platform, which effectively improves the efficiency and reduces the pressure of data calculation of the management platform.

16 Claims, 4 Drawing Sheets

(56) References Cited

U.S. PATENT DOCUMENTS

| | | | |
|---|---|---|---|
| 11,782,424 B1* | 10/2023 | Shao | G05B 19/4183 |
| | | | 700/99 |
| 11,829,120 B1* | 11/2023 | Shao | G05B 19/4065 |
| 11,830,091 B2* | 11/2023 | Shao | G06Q 50/06 |
| 11,860,610 B2* | 1/2024 | Shao | G05B 19/4185 |
| 11,874,650 B2* | 1/2024 | Shao | G05B 19/41875 |
| 2024/0028008 A1* | 1/2024 | Shao | G05B 19/418 |
| 2024/0036558 A1* | 2/2024 | Shao | G05B 19/4065 |

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

* cited by examiner

300

310 Obtaining a statistical value of the second data within at least one second preset time period, the statistical value including a range value, an average value, and a variance value of the second data

320 Determining the abnormal predictive value by processing the statistical value, a processing feature, and a cycle length based on the abnormal model

330 Obtaining the classification result based on the first abnormal threshold

340 Obtaining first data corresponding to the maximum second data corresponding to the range value as a maximum time when the classification result is abnormal; and obtaining first data corresponding to the minimum second data corresponding to the range value as a minimum time

350 Calculating a difference value between the maximum time and the minimum time as the difference time and determining whether the upstream stage is abnormal based on the different time by the sub-platform

FIG. 3

INDUSTRIAL INTERNET OF THINGS WITH INDEPENDENT MANAGEMENT PLATFORM AND CONTROL METHODS THEREOF

TECHNICAL FIELD

The present disclosure relates to a field of intelligent manufacturing technology, and specifically relates to industrial internet of things with independent management platform and control methods thereof.

BACKGROUND

The industrial internet of things keeps on blending a variety of collect sensors, control sensors, or controllers with perception and monitoring capabilities, as well as technologies such as mobile communication and intelligent analysis into all aspects of the industrial production process, thereby greatly improving the efficiency of manufacturing, improving product quality, reducing products cost and resource consumption. Finally, it elevates the traditional industry to a new stage of intelligence.

The industrial internet of things has now begun to apply in intelligent manufacturing technology, and achieve production control through centralized control of the entire production line. However, at present, for some large-scale production lines, different production equipment requires to transport materials across lines or even across plants through material transport equipment, which makes it difficult to centralize the control of large-scale production lines, and makes the pressure of centralized control servers huge.

SUMMARY

In order to overcome the above-mentioned shortcomings in the prior art, the purpose of the present disclosure is to provide an industrial internet of things with independent management platform and control methods thereof.

In the first aspect, the embodiments of the present disclosure provide an industrial internet of things with independent management platform, comprising: a user platform, a service platform, a management platform, a sensor network platform, and an object platform interacting in sequence; wherein:
  the service platform and the sensor network platform both use a centralized arrangement, and the management platform uses an independent arrangement; the centralized arrangement means that a platform uniformly receives data, uniformly processes data, and/or uniformly sends data; the independent arrangement means that a platform uses different sub-platforms to store, process, and/or transmit different types of data;
  the management platform comprises a plurality of sub-platforms; each of the sub-platforms corresponds to a type of a production line stage; the type of the production line stage comprises a first stage and a second stage associated with the first stage;
  when the management platform receives sensing detection data transmitted by the object platform, the sensing detection data is presented to the user platform by the service platform after being processed by a sub-platform corresponding to the sensing detection data; and
  when the management platform sends a control command to the object platform, a control parameter of the type of the production line stage is calculated by a sub-platform corresponding to the type of the production line stage, and the control parameter is sent to the object platform as the control command.

In a possible implementation, the first stage is a processing stage, the second stage is a material stage associated with the first stage; and the material stage comprises a feeding stage and a blanking stage.

In a possible implementation, the sensing detection data received by the management platform comprises first data configured as a trigger time of material arrival of the feeding stage and second data configured as an amount of material arrival of the feeding stage; and
  when the control parameter of the type of the production line stage is calculated by a sub-platform corresponding to the type of the production line stage, a processing amount of the first stage is calculated according to the count of the first data and the second data received in a first preset time period, and a processing rate of the first stage is calculated as a control parameter of the first stage according to the processing amount.

In a possible implementation, the sensing detection data received by the management platform further comprises third data configured as a trigger time of material discharge of the blanking stage and fourth data configured as an amount of material discharge of the blanking stage;
  when the sub-platform receives the third data and the fourth data, an amount of material discharge of the blanking stage is calculated according to a count of the third data and the fourth data received in the first preset time period;
  the sub-platform calibrates the processing amount of the first stage according to the amount of material discharge;
  when calibrating, the sub-platform calculates a difference value between the amount of material discharge and the processing amount and judges that a production line is abnormal when the difference value exceeds a preset value; and
  when the production line is abnormal, the sub-platform reduces the processing rate of the first stage as the control parameter of the first stage and emits an abnormal notice to the user platform through the service platform.

In a possible implementation, the sub-platform uses the first preset time period as a cycle to calibrate the second data;
  when calibrating the second data, the sub-platform obtains a range value of the second data in the cycle, obtains first data corresponding to maximum second data corresponding to the range value as a maximum time when the range value exceeds a threshold, and obtains first data corresponding to minimum second data corresponding to the range value as a minimum time;
  the sub-platform calculates a difference value between the maximum time and the minimum time as a difference time and calculates a ratio of the difference time to the cycle as a calibration ratio; and
  when the calibration ratio is smaller than a preset value, the sub-platform sends abnormal information of upstream production to the user platform through the service platform.

In the second aspect, the embodiments provide a control method of industrial internet of things with independent management platform, which is implemented in a user platform, a service platform, a management platform, a sensor network platform, and an object platform interacting in sequence; wherein:

the service platform and the sensor network platform both use a centralized arrangement, and the management platform uses an independent arrangement; the centralized arrangement refers to a platform uniformly receives data, uniformly processes data, and/or uniformly sends data; the independent arrangement means that a platform uses different sub-platforms to store, process, and/or transmit different types of data;

the management platform comprises a plurality of sub-platforms; each of the sub-platforms corresponds to a type of a production line stage; the type of the production line stage comprises a first stage and a second stage associated with the first stage; and the control method comprises:

when the management platform receives sensing detection data transmitted by the object platform, presenting the sensing detection data to the user platform by the service platform after being processed by a sub-platform corresponding to the sensing detection data; and when the management platform sends a control command to the object platform, calculating a control parameter of the type of production line stage by a sub-platform corresponding to the type of the production line stage, and sending the control parameter to the object platform as the control command.

In a possible implementation, the first stage is a processing stage, the second stage is a material stage associated with the first stage; and the material stage comprises a feeding stage and a blanking stage.

In a possible implementation, the sensing detection data received by the management platform comprises first data configured as a trigger time of material arrival of the feeding stage and second data configured as an amount of material arrival of the feeding stage; and the control method also comprises:

when the control parameter of the type of the production line stage is calculated by a sub-platform corresponding to the type of the production line stage, calculating a processing amount of the first stage according to the count of the first data and the second data received in a first preset time period, and calculating a processing rate of the first stage as the control parameter of the first stage according to the processing amount.

In a possible implementation, the sensing detection data received by the management platform further includes third data configured as a trigger time of material discharge of the blanking stage and fourth data configured as an amount of material discharge of the blanking stage;

The control method also comprises:

when the sub-platform receives the third data and the fourth data, calculating an amount of material discharge of the blanking stage according to a count of the third data and the fourth data received in the first preset time period;

calibrating, by the sub-platform, the processing amount of the first stage according to the amount of material discharge;

when calibrating, calculating, by the sub-platform, a difference value between the amount of material discharge and the processing amount and judging that a production line is abnormal when the difference value exceeds a preset value; and when the production line is abnormal, reducing, the sub-platform, the processing rate of the first stage as the control parameter of the first stage and emitting an abnormal notice to the user platform through the service platform.

In a possible implementation, the method also comprises:

using, by the sub-platform, the first preset time period as a cycle to calibrate the second data;

when calibrating the second data, obtaining, by the sub-platform, a range value of the second data in the cycle, obtaining first data corresponding to maximum second data corresponding to the range value as a maximum time when the range value exceeds a threshold and obtaining first data corresponding to minimum second data corresponding to the range value as a minimum time;

calculating, by the sub-platform, a difference value between the maximum time and the minimum time as a difference time and calculates a ratio of the difference time to the cycle as a calibration ratio; and when the calibration ratio is smaller than a preset value, sending, by the sub-platform, abnormal information of upstream production to the user platform through the service platform.

The present disclosure has the following advantages and beneficial effects compared to the prior art.

In the industrial internet of things with independent management platform and control methods thereof of the present disclosure, the service platform and the sensor network platform both use a centralized arrangement, and the management platform uses an independent arrangement, data management and arithmetic control for the data of each production stage can be separately performed through different sub-platforms in the management platform, which effectively improves the data computing efficiency of the management platform, and reduces the data computing pressure of the management platform.

BRIEF DESCRIPTION OF THE DRAWINGS

The drawings described herein are used to provide a further understanding of the embodiments of the present disclosure, construct a part of the present disclosure, and do not constitute a limit to the embodiment of the present disclosure. In the drawings:

FIG. 3 is a flowchart illustrating an exemplary process for the judgment of whether the upstream stage is abnormal according to some embodiments of the present disclosure;

DETAILED DESCRIPTION

Figure 1:
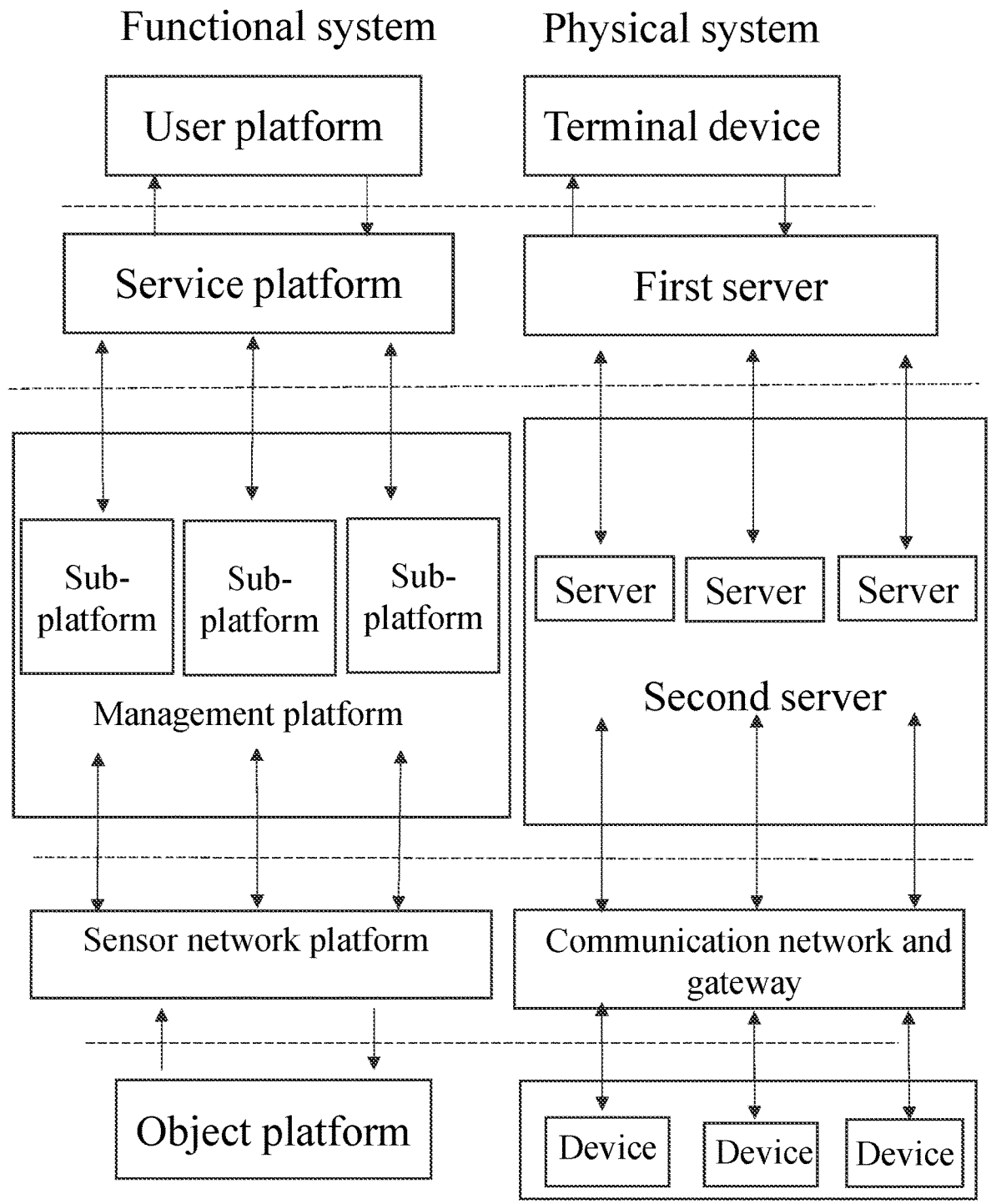
FIG. 1 is an architecture schematic diagram of the embodiments of the present disclosure.

To make the purpose, technical solutions, and advantages of the embodiments of the present disclosure clearer, the following will be combined with the drawings of the embodiments of the present disclosure to clearly and completely illustrate the technical solutions in the embodiments of the present disclosure. To be understood, the drawings of the embodiments of the present disclosure only play the purpose of explanation and description and be not used to limit the scope of the protection of the present disclosure. In addition, it should be understood that the schematic drawings are not drawn according to the physical scale. The flowcharts used in the present disclosure illustrate operations implemented according to some embodiments of the present disclosure. It should be understood that the operations of the flowchart may not be implemented in order, and the steps without logical contextual relationships may be reversed or implemented simultaneously. Moreover, those skilled in the art may add one or more other operations to the flowchart, or remove one or more operations from the flowchart under the guidance of the content of the present disclosure. The terminology used herein is for the purpose of describing particular example embodiments only and is not intended to be limiting. As used herein, the singular forms "a," "an," and "the" may be intended to include the plural forms as well, unless the context clearly indicates otherwise, and the plural forms may be intended to include the singular form unless the context clearly indicates otherwise.

In addition, the described embodiments are merely a part of the embodiments of the present disclosure, not all of the embodiments. Components of the embodiments of the present disclosure described and illustrated in the drawings herein may be arranged and designed in a variety of different configurations. Thus, the detailed description of the embodiments of the present disclosure provided in the drawings is not intended to limit the scope of the present disclosure which requires protection, but only the selected embodiments of the present disclosure. Based on the embodiments of the present disclosure, all other embodiments obtained by those skilled in the art without creative labor belong to the scope of the protection of the present disclosure.

To facilitate the elaboration of the above-mentioned industrial internet of things with an independent management platform, combine and refer to FIG. 1, which provides a schematic diagram of the communication architecture of the industrial internet of things with the independent management platform of the embodiments of the present disclosure. The industrial internet of things with independent management platform includes a user platform, a service platform, a management platform, a sensor network platform, and an object platform interacting in sequence.

The service platform and the sensor network platform both use a centralized arrangement, and the management platform uses an independent arrangement. The centralized arrangement means that a platform uniformly receives data, uniformly processes data, and uniformly sends data. The independent arrangement means that a platform uses different sub-platforms to store, process, and/or transmit different types of data.

The management platform includes a plurality of sub-platforms. Each of the sub-platforms corresponds to a type of a production line stage (or a stage, a link, or a process of a production line). The type of the production line stage includes a first stage and a second stage associated with the first stage.

When the management platform receives sensing detection data transmitted by the object platform, the sensing detection data is presented to the user platform by the service platform after being processed by a sub-platform corresponding to the sensing detection data.

When the management platform sends a control command to the object platform, a control parameter of the type of the production line stage is calculated by a sub-platform corresponding to the type of the production line stage, and the control parameter is sent to the object platform as the control command.

In the embodiments of the present disclosure, the user platform is configured as a terminal device and interacts with a user. The service platform is configured as a first server, and extracts information needed to process the user platform from the management platform, and transmits it to the user platform. The management platform is configured as a second server and controls the operation of the object platform and receives feedback data from the object platform. The sensor network platform is configured as a communication network and a gateway for the interaction of the object platform and the management platform. The object platform is configured as production line equipment and production line sensors to execute manufacturing.

In the embodiment, the service platform uses a centralized arrangement means that the first server uniformly receives data, and uniformly sends data. The first server may be a single server or a server cluster. The management platform uses an independent arrangement means that the second server is classified into multiple sub-platforms according to different types of production line stages. The sub-platforms may be implemented by different servers or may be implemented by calls of different kernels on the same server. The second server may be a single server or a server cluster. The production line stage in the embodiment is divided according to the degree of correlation between different stages. Preferably, the continuous production stage may be used as the first stage, and the feeding stage and the blanking stage of the first stage are used as the second stage. Independent control may be performed between each type of production line stage which is screened out by the above method.

In the embodiments of the present disclosure, the management platform is divided into a plurality of sub-platforms which may independently process different types of production lines. Since the classification of the production lines is based on the correlation, each type of production line stage may do not access data of other production lines, effectively reducing the complexity of data processing and improving the efficiency of data processing.

In a possible implementation, the first stage is a processing stage, the second stage is a material stage associated with the first stage; and the material stage includes a feeding stage and a blanking stage.

In a possible implementation, the sensing detection data received by the management platform includes first data configured as a trigger time of material arrival of the feeding stage and second data configured as an amount of material arrival of the feeding stage; and when the control parameter of the type of the production line stage is calculated by a sub-platform corresponding to the type of the production line stage, a processing amount of the first stage is calculated according to a count of the first data and the second data received in a first preset time period, and a processing rate of the first stage is calculated as a control parameter of the first stage according to the processing amount.

When the present embodiment is implemented, the processing rate is controlled by the amount of feeding, which is particularly suitable for a processing stage where the interval of production is adjustable, such as a line of sheet cutting. Because the processing rate is controlled, the device corresponding to the processing stage does not need to detect the material's arrival at every moment. It only needs to set the detection time according to the processing rate to fine-tune the processing time, which can effectively improve the life of the sensing device on the processing equipment.

In the embodiments of the present disclosure, the amount of material reaching the current processing stage is calculated through the second data and the count of the first data. Generally speaking, the second data is a stable value, that is, the amount of each transported material is basically the same. In this case, the product of the count of the first data and the second data may be used. In another case, the second data is fluctuating, then the count of the second data may be verified by the count of the first data. The count of the first data is consistent and corresponds to the count of the second data. After the verification, the amount of material is obtained by continuously adding all the second data. The rate of processing may be determined by the amount of material to realize rapid control of the processing stage.

In a possible implementation, the sensing detection data received by the management platform further includes third data configured as a trigger time of material discharge of the blanking stage and fourth data configured as an amount of material discharge of the blanking stage.

When the sub-platform receives the third data and the fourth data, the amount of material discharge of the blanking stage is calculated according to the count of the third data and the fourth data received in the first preset time period.

The sub-platform calibrates the processing amount of the first stage according to the amount of material discharge.

When calibrating, the sub-platform calculates a difference value between the amount of material discharge and the processing amount and judges that the production line is abnormal when the difference value exceeds a preset value.

When the production line is abnormal, the sub-platform reduces the processing rate of the first stage as the control parameter of the first stage and emits an abnormal notice to the user platform through the service platform.

When the present embodiment is implemented, the verification of the processing amount through the amount of material discharge is used to achieve the closed-loop control of the production line. The amount of material discharge is calculated through the third data and the fourth data. The calculation process corresponds to the above-mentioned amount of the feeding. Whether there is a problem with the current production line may be found according to the comparison between the amount of material discharge and the processing amount. If there is a problem, the speed of the first stage is reduced firstly to avoid damaging the device caused by a sudden shutdown when a major accident occurs, and an abnormal notice is issued to inform the user platform.

In a possible implementation, the sub-platform uses the first preset time period as a cycle to calibrate the second data.

When calibrating the second data, the sub-platform obtains a range value of the second data in the cycle, obtains and the first data corresponding to maximum second data corresponding to the range value as a maximum time when the range value exceeds a threshold, and obtains first data corresponding to minimum second data corresponding to the range value as a minimum time.

The sub-platform calculates a difference value between the maximum time and the minimum time as a difference time and calculates a ratio of the difference time to the cycle as a calibration ratio.

When the calibration ratio is smaller than a preset value, the sub-platform sends abnormal information of upstream production to the user platform through the service platform.

When the embodiment is implemented, although each sub-platform may realize the control and detection of a type of production line process, sometimes it is difficult to detect the problem of equipment of the production line process relying on the data of a sub-platform alone. The sensing data may seem normal, but there are problems with the discharge. To reduce the complexity of the system, the sub-platform of the present disclosure does not have any data communication directly, so the embodiment of the present disclosure uses the first preset time period as a cycle to calibrate the upstream production line.

In the embodiment of the present disclosure, the same first preset time period as the above embodiment is used as a cycle to calibrate the second data, and the method of calibration is calculating the range value of the second data within a cycle. The judgment of the first phase is performed by the range value obtained, that is, when the range value exceeds the threshold, it is determined that the upstream production line may have problems. At this time, the gradient of the variation of the range value is calculated according to the difference time, which may characterize the speed of production and material delivery of the upstream production line. The speed may accurately reflect the condition of the upstream production line, thereby warning. The embodiment may determine the condition of the upstream process based on the relatively independent data obtained by the independent management platform, effectively reducing the calculation pressure of the management platform itself.

In some embodiments, the sub-platform may also be configured to determine whether the upstream stage is abnormal. The first stage is a processing stage, and the upstream stage is a feeding stage. The sub-platform may obtain the statistical value of the second data within the second preset time period at least. The statistical value may include a range value, an average value, and a variance value of the second data. The sub-platform may determine the abnormal predictive value by processing the statistical values, processing features, and cycle lengths based on the abnormal model. The sub-platform may obtain a classification result based on the first abnormal threshold. When the classification result is abnormal, the first data corresponding to the maximum second data corresponding to the maximum range value may be obtained as the maximum time. And the first data corresponding to the minimum second data corresponding to the minimum range value may be obtained as the minimum time. The sub-platform may calculate the difference value between the maximum time and the minimum time as the difference time and determine whether the upstream stage is abnormal based on the difference time.

In some embodiments, the sub-platform may obtain multiple groups of statistical values of the difference time. The sub-platform may determine the first abnormal result and the first confidence degree by processing the multiple groups of statistical values, the time intervals of the cycle corresponding to the multiple groups of statistical values, and processing feature based on a long short-term memory. The processing feature may be used as a starting node to input the long short-term memory.

In some embodiments, when the first confidence degree is smaller than the threshold of the confidence degree, the sub-platform may reduce the first abnormal threshold. The sub-platform may obtain new multiple groups of statistical values of the difference time based on the first abnormal threshold after reduction. The sub-platform may determine the second abnormal result and the second confidence degree based on processing the new multiple groups of statistical values, the new time intervals of the cycle corresponding to the multiple groups of statistical values, and the processing feature based on the long short-term memory.

Figure 2:
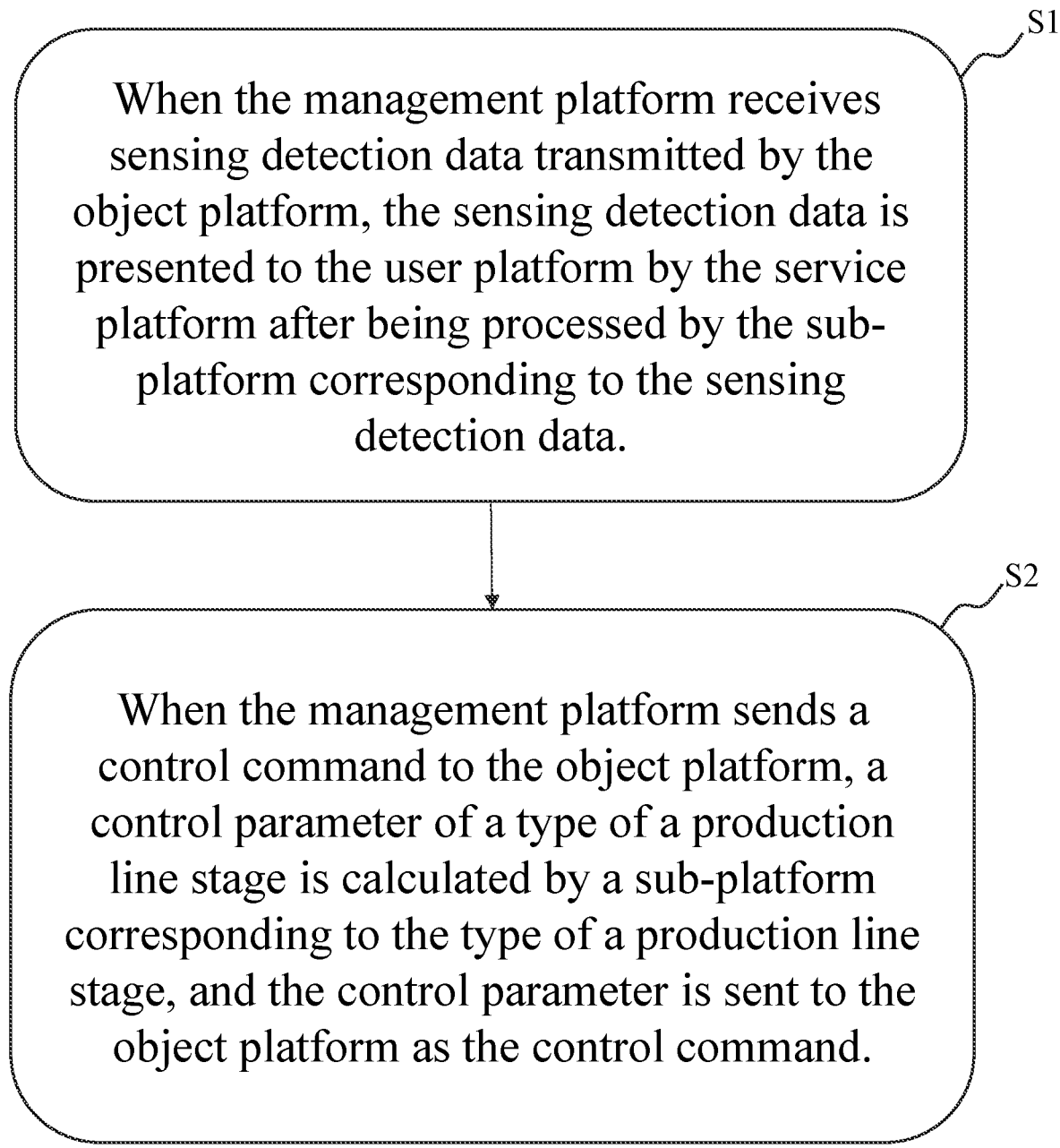
FIG. 2 is a schematic diagram of the methods and steps of the embodiments of the present disclosure.

Based on the above, refer to FIG. 2, which is a flowchart illustrating an exemplary process for the control method of the industrial internet of things with the independent management platform provided by the embodiments of the present disclosure. The control method of industrial internet of things with independent management platform may be applied to the industrial internet of things with independent management platform of FIG. 1. Further, the control method of the industrial internet of things with independent management platform may include the content described in step S1-step S2.

S1: when the management platform receives sensing detection data transmitted by the object platform, the sensing detection data is presented to the user platform by the service platform after being processed by the sub-platform corresponding to the sensing detection data;

S2: when the management platform sends a control command to the object platform, a control parameter of a type of a production line stage is calculated by a sub-platform corresponding to the type of a production line stage, and the control parameter is sent to the object platform as the control command.

In a possible implementation, the first stage is a processing stage, the second stage is a material stage associated with the first stage; and the material stage includes a feeding stage and a blanking stage.

In a possible implementation, the sensing detection data received by the management platform includes first data configured as a trigger time of material arrival of the feeding stage and second data configured as an amount of material arrival of the feeding stage; and The control method also includes the following steps.

When the sub-platform calculates the corresponding type of the control parameter of the production line stage, a processing amount of the first stage is calculated according to the count of the first data and the second data received in the first preset time period, and a processing rate of the first stage is calculated as the control parameter of the first stage according to the processing amount.

In a possible implementation, the sensing detection data received by the management platform further includes third data configured as a trigger time of material discharge at the blanking stage and fourth data configured as an amount of material discharge at the blanking stage.

The control method also includes the following steps.

When the sub-platform receives the third data and the fourth data, the amount of material discharge at the blanking stage is calculated according to the count of the third data and the fourth data received in the first preset time period.

The sub-platform calibrates the processing amount of the first stage according to the amount of material discharge.

When calibrating, the sub-platform calculates a difference value between the amount of material discharge and the processing amount and judges that the production line is abnormal when the difference value exceeds a preset value.

When the production line is abnormal, the sub-platform reduces the processing rate of the first stage as the control parameter of the first stage and emits an abnormal notice to the user platform through the service platform.

In a possible implementation, the method also includes the following steps.

The sub-platform uses the first preset time period as a cycle to calibrate the second data.

When calibrating the second data, the sub-platform obtains a range value of the second data in the cycle; determines the first data corresponding to the maximum second data corresponding to the range value as a maximum time when the range value exceeds the threshold; and determines the first data corresponding to the minimum second data corresponding to the range value as a minimum time.

The sub-platform calculates the difference value between the maximum time and the minimum time as a difference time and calculates a ratio of the difference time to the cycle as a calibration ratio.

When the calibration ratio is smaller than a preset value, the sub-platform sends abnormal information of upstream production to the user platform through the service platform.

FIG. 3 is a flowchart illustrating an exemplary process for the judgment of whether the upstream stage is abnormal according to some embodiments of the present disclosure. As shown in FIG. 3, flow 300 includes the following steps. In some embodiments, the flow 300 may be performed by the sub-platform.

The upstream stage may refer to the material stage associated with the first stage. In some embodiments, the upstream stage may be a feeding stage in the material stage, which may provide materials for the processing stage.

Step 310, obtaining a statistical value of the second data within at least one second preset time period. The statistical value may include a range value, an average value, and a variance value of the second data.

The second preset time period may refer to a preset certain time period. For example, the second preset time period may be 30 minutes, etc. In some embodiments, the second preset time period is similar to the first preset time period, and may both refer to a preset certain time period. The sub-platform may set the first preset time period and the second preset time period according to actual needs.

The statistical value of the second data may refer to the value after the second data is processed. The statistical value of the second data may include the range value, the average value, the variance value of the second data, or the like.

In some embodiments, the sub-platform may acquire statistical values of the second data within one or more second preset time periods. The second data may include the amount of material arrival. In the process of production, the amount of material arrival is generally fixed. For example, the amount of material arrival is 70 or 80, or the like.

One or more second preset time periods may be understood as one or more preset cycles. A second preset time period may be understood as a preset cycle. Each preset cycle may include a plurality of production cycles of production stages.

The range value of the second data may refer to the difference value between the maximum amount and the minimum amount of arrived material (material arrival) of the feeding stage at multiple times within the second preset time period (e.g., within the second preset time period, material is arrived at the feeding stage at multiple times, there is an amount of material arrival at each time). The average value of the second data may refer to the average value of the amount of material arrival of feeding stage at multiple times within the second preset time period. The variance value of the second data may refer to the average value of the square of a difference value between the amount of material arrival at each time and the average value of the second data of feeding stage within the second preset time period.

In some embodiments, the sub-platform may obtain the amount of material arrival of feeding stage at multiple times in one or more second preset time periods. The sub-platform obtains statistic values of the second data by calculation processing. For example, the amount of material arrival at multiple times in the second preset time period 1 is 70, 70, 75, 85. The sub-platform may obtain a statistical value of the second data by calculating. The statistical value of the second data may include that: the range value of the second data is 15, the average value of the second data is 75, and the variance value of the second data is 37.5.

Step 320, determining the abnormal predictive value by processing the statistical value, a processing feature, and a cycle length based on the abnormal model.

The abnormal model refers to the model that may initially determine whether the upstream stage is abnormal. In some embodiments, the abnormal model may be a classification model or the like. The abnormal model may be determined depending on the detailed situation, for example, the abnormal model may be a depth neural network model, a convolutional neural network model, or the like.

In some embodiments, the input of the abnormal model may include statistical values, processing features, cycle lengths, or the like. The output of the abnormal model may include an abnormal predictive value.

A processing feature may represent features of the processing stage. For example, the processing features may include processing rates, processing parameters, or the like. The length of the cycle (or cycle length) may refer to the length of a production cycle in the processing stage. For example, the length of the cycle may be represented by time, such as 5 minutes, 10 minutes, etc.

An abnormal predictive value may refer to a preliminary predictive value about whether the upstream stage is abnormal. For example, the abnormal predictive value may be represented by a real number between 0 and 1. In some embodiments, a statistical value within a second preset time period corresponds to an abnormal predictive value. A plurality of statistical values within a plurality of second preset time periods correspond to a plurality of abnormal predictive values.

In some embodiments, the sub-platform may input the statistical value, processing feature, cycle length, or the like, into the abnormal model, and the abnormal model outputs the abnormal predictive value. For example, the abnormal predictive value outputted by the abnormal model is, for example, 0.3, 0.7, or the like, and is preliminary predictive values which indicates that there is an abnormity in the upstream stage. For example, 0.3 is small, indicating that the possibility of abnormality in the upstream stage is small; 0.7 is large, indicating that the possibility of abnormality in the upstream stage is large.

In some embodiments, an abnormal model may be obtained based on a plurality of training samples and label training.

In some embodiments, training samples include sample statistical values, sample processing features, and sample cycle lengths. The label is the result of whether the sample upstream stage is abnormal (normal or abnormal). Training data may be obtained based on historical data, for example, the actual detection data of the upstream stage is obtained by the detecting device of the object platform, and includes a plurality amounts of material arrival, or the like. The plurality amounts of material arrival, or the like, are uploaded to the management platform through the sensor network platform. The sub-platform may obtain training samples of the abnormal model by processing data. The label of training data may be determined by manually labeling or automatically labeling. For example, the sub-platform may perform labeling by determining whether the upstream stage is abnormal at one or more second preset time periods according to historical data.

Step 330, obtaining the classification result based on the first abnormal threshold.

The first abnormal threshold refers to a threshold that may be used to classify for abnormal predictive values. For example, the first abnormal threshold may be 0.4, 0.5, 0.6, or the like. In some embodiments, the first abnormal threshold is adjustable, and the sub-platform may adjust the first abnormal threshold based on the actual needs or preset rules. For example, the sub-platform may reduce the first abnormal threshold.

A classification result may refer to a preliminary classification result of whether the upstream stage is abnormal. For example, the classification result may include normal, abnormal, or the like. The classification result may be represented by 0 or 1. For example, 0 means the upstream stage is normal, and 1 means the upstream stage is abnormal.

In some embodiments, the sub-platform may obtain the classification result based on the first abnormal threshold. For example, the first abnormal threshold is 0.5, and the abnormal predictive value is 0.35, 0.45, etc., which is smaller than 0.5; the sub-platform may obtain the classification result of 0, indicating that the upstream stage within the corresponding second preset time period is normal. As another example, the first abnormal threshold is 0.5, and the abnormal predictive value is 0.7, which is larger than 0.5; the sub-platform may obtain the classification result of 1, indicating that the upstream stage within the corresponding second preset time period is abnormal. In some embodiments, the sub-platform may obtain classification results of a plurality of second preset time periods based on the first abnormal threshold.

Step 340, obtaining first data corresponding to the maximum second data corresponding to the range value as a maximum time when the classification result is abnormal; and obtaining first data corresponding to the minimum second data corresponding to the range value as a minimum time.

The first data corresponding to the maximum second data corresponding to the range value may refer to a trigger time of material arrival corresponding to the maximum amount of material arrival in the second preset time period. The first data corresponding to the minimum second data corresponding to the range value may refer to a trigger time of material arrival corresponding to the minimum amount of material arrival in the second preset time period.

In some embodiments, the sub-platform may obtain the maximum time and the minimum time within a plurality of the second preset time periods when the classification result is abnormal. For example, the maximum second data in a certain second preset time period is the amount of material arrival 100, and the minimum second data is the amount of material arrival 60. The sub-platform may obtain the trigger time of material arrival (such as 10:20) corresponding to the amount of material arrival 100, and use 10:20 as the maximum time. The sub-platform may obtain the trigger time of material arrival (such as 10:35) corresponding to the amount of material arrival 60, and use 10:35 as the minimum time.

Step 350, calculating a difference value between the maximum time and the minimum time as the difference time and determining whether the upstream stage is abnormal based on the difference time by the sub-platform.

The difference time may represent a time distance in which the amount of material arrival fluctuates the most in the second preset time period. For example, as described above, the corresponding difference time between the maximum time and the minimum time 10:35 is 15 minutes. The sub-platform may obtain multiple difference times within a plurality of the second preset time periods when the classification result is abnormal.

In some embodiments, the sub-platform may determine whether the upstream stage is abnormal based on the difference time. For example, the sub-platform may obtain a plurality of difference times, and calculate ratios of difference times and the second preset time periods, respectively. Whether the upstream stage is abnormal may be determined through the comparison of each ratio with a preset value.

A ratio of a difference time and a second preset time period may reflect the time during which maximum fluctuation for the amounts of material arrival appears. For example, the smaller the above ratio, the shorter the time of maximum fluctuation appearing, and the amount of material arrival fluctuates over a short period of time (such as a surge or decrease in the amount of material arrival, etc.). The larger the above ratio, the longer the time of maximum fluctuation appearing. For example, a plurality of difference times are 5 minutes, 10 minutes, 15 minutes, etc., a plurality of all the second preset time periods are 50 minutes, the preset value is 0.3. The ratios calculated by the sub-platform of the above difference times and the second preset time periods are 0.1, 0.2, and 0.3 respectively. The above ratios are smaller than or equal to the preset value 0.3, and the sub-platform may determine the upstream stage is abnormal.

In some embodiments, the sub-platform may determine whether the upstream stage is abnormal based on the above ratios smaller than or equal to a proportional threshold of the preset value. The proportional threshold may refer to the minimum proportion value that is used to determine whether the upstream stage is abnormal, for example, the proportional threshold is 0.6. For example, the ratios of the difference times and the second preset time periods are 0.1, 0.2, 0.3, 0.4, and 0.3, respectively. The ratio smaller than or equal to the preset value is 0.8, which is larger than the proportion threshold 0.6, and the sub-platform may determine the upstream stage is abnormal. As another example, the ratios of the difference times and the second preset time periods are 0.4, 0.2, 0.3, 0.4, and 0.5 respectively. The ratio smaller than or equal to the preset value is 0.4, which is larger than the proportion threshold 0.6, and the sub-platform may determine the upstream stage is normal.

In some embodiments, the sub-platform may determine the first abnormal result and the first confidence degree by processing the multiple groups of statistical values, the time interval of the cycle corresponding to the multiple groups of statistical values, and the processing feature based on a long short-term memory. The sub-platform may determine whether the upstream stage is abnormal based on the first abnormal result and the first confidence degree. For details on determining whether the upstream stage is abnormal based on the first abnormal result and the first confidence degree, refer to the description in FIG. 4.

In some embodiments of the present specification, a plurality of the abnormal predictive values may be determined by processing a plurality of the statistical values, processing features, and cycle lengths of the second data in a plurality of the second preset time periods based on the abnormal model. The multiple classification results are determined by the comparison between the abnormal predictive values and the first abnormal threshold, thereby obtaining a plurality of difference values of the time. Whether the upstream stage is abnormal may be determined based on a plurality of difference values of the time. Thus, the accuracy of determining whether the upstream stage is abnormal can be improved.

Figure 4:
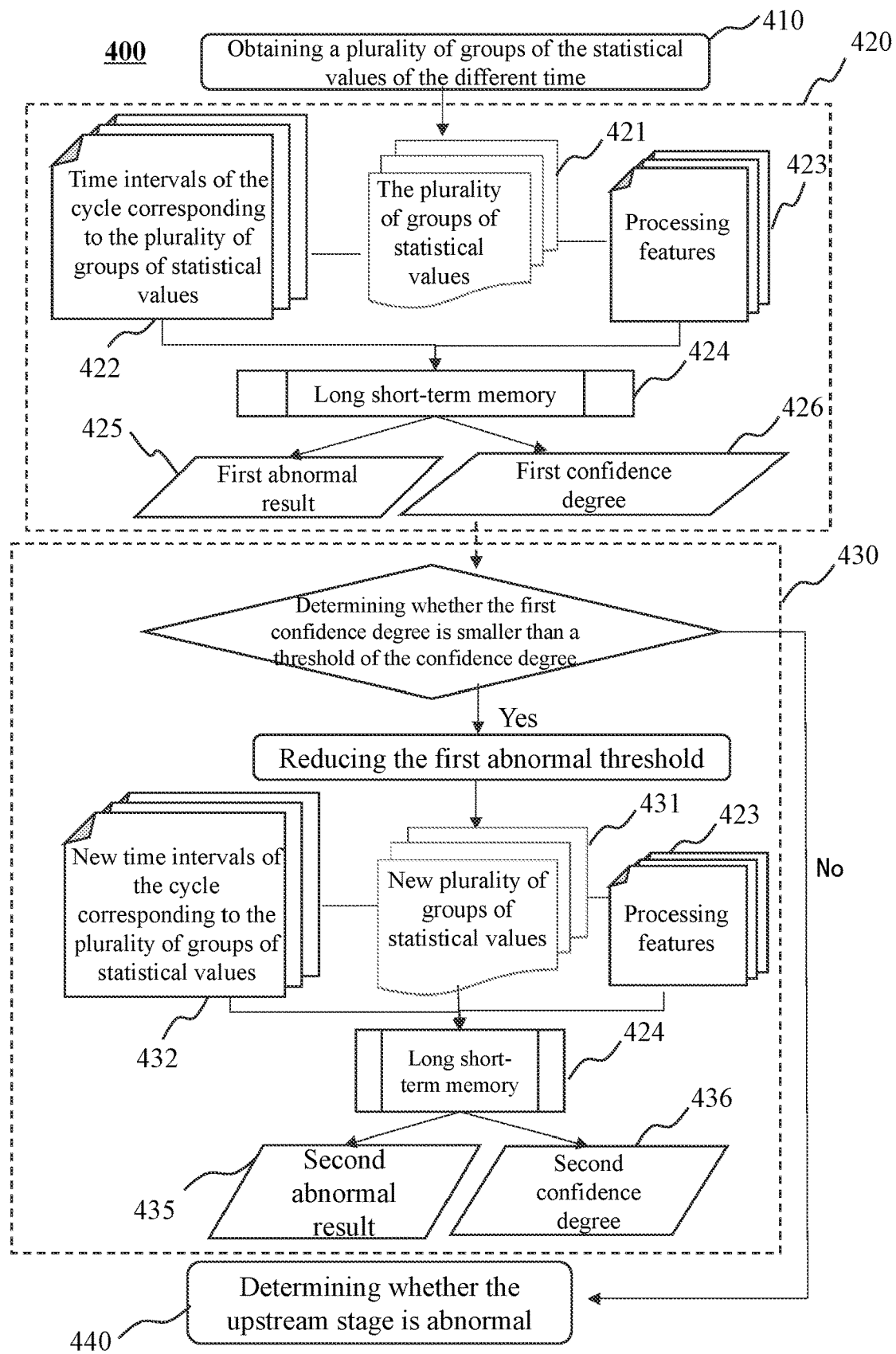
FIG. 4 is a schematic diagram illustrating an exemplary process for the determination of abnormal results and confidence degrees based on a long short-term memory according to some embodiments of the present disclosure.

FIG. 4 is a schematic diagram illustrating an exemplary process for the determination of abnormal results and confidence degrees based on a long short-term memory according to some embodiments of the present disclosure. As shown in FIG. 4, flow 400 includes the following steps. In some embodiments, the flow 400 may be executed by a sub-platform.

Step 410, obtaining a plurality of groups of the statistical values of the difference time.

A plurality of groups of the statistical values of the difference time refer to a plurality of groups of values after the second data is processed within a plurality of second preset time periods corresponding to the difference time. Each group of statistical values may include a range value, an average value, a variance value, or the like of the second data within a second preset time period.

In some embodiments, the sub-platform may obtain multiple groups of statistical values of the difference time. For example, the sub-platform obtains statistical values within the second preset time period corresponding to each difference time. A plurality of difference times correspond to a plurality of second preset time periods, and thus a plurality of groups of statistical values are obtained by the sub-platform.

Step 420, determining the first abnormal result and the first confidence degree by processing the plurality of groups of statistical values, the time intervals of the cycles corresponding to the plurality of groups of statistical values, and processing features based on the long short-term memory. Processing features may be inputted into the long short-term memory as a starting node.

Long Short-Term Memory (LSTM) refers to a model that may determine the abnormal result and confidence degree of the upstream stage. In some embodiments, the input of the long short-term memory 424 may include a plurality of groups of statistical values 421, the time intervals 422 of the cycles corresponding to the multiple groups of statistical values, and processing features 423, or the like. In some embodiments, the input of long short-term memory 424 may also include data of the production process, such as processing features and types of processing equipment, or the like. The output of the long short-term memory 424 may include the first abnormal result 425 and the first confidence degree 426.

In some embodiments, the time intervals of the cycles corresponding to the multiple groups of statistical values may refer to the time intervals of the second preset time periods corresponding to the multiple groups of statistical values. For example, a second preset time period is 30 minutes, and the time intervals of the cycles corresponding to the multiple groups of statistical values are 0, 90, 300, 600, or the like.

The smaller the time interval, the more adjacent the cycles corresponding to the multiple groups of statistical values. The larger the time interval, the farther the cycles corresponding to the multiple groups of statistical values.

In some embodiments, when the time intervals of the cycles corresponding to the multiple groups of statistical values are all 0 or smaller than a certain value (such as 30, etc.), it indicates that the classification results of the adjacent plurality of second preset time periods are mostly abnormal. The classification results of the adjacent plurality of second preset time periods are mostly abnormal, which indicates that large fluctuations appearing and the possibility of abnormality of equipment is large.

In some embodiments, when the time intervals of the cycles corresponding to the multiple groups of statistical values are all larger than a certain value (such as 300, etc.), it indicates that the classification results of the plurality of second preset time periods with a long time interval are mostly abnormal. The classification results of the plurality of second preset time periods with a long time interval are mostly abnormal, which indicates an abnormality occasionally appears, which may be fluctuations caused by accidental factors, and the possibility of abnormality of equipment is small.

The first abnormal result may refer to the result of whether the upstream stage is abnormal. For example, the first abnormal result may include normal, abnormal, or the like. The first abnormal result may be represented by 0 or 1. For example, 0 means that the upstream stage is normal, and 1 means the upstream stage is abnormal. The first confidence degree may refer to the credibility of the first abnormal result. The first confidence degree may be represented by a value between 0 and 1. The larger the value, the more credible the first abnormal result.

In some embodiments, the sub-platform may input the multiple groups of statistical values, the time intervals of the cycles corresponding to the multiple groups of statistical values, and processing features or the like into the long short-term memory. The long short-term memory outputs the first abnormal result and the first confidence degree. For example, the long short-term memory outputs that the first abnormal result is 1, and the first confidence degree is 0.53. As another example, the long short-term memory outputs that the first abnormal result is 1, and the first confidence degree is 0.92.

In some embodiments, the long short-term memory may be obtained based on a plurality of training samples and label training.

In some embodiments, the training samples include multiple sample groups of statistical values, the time intervals of the cycles corresponding to the multiple sample groups of statistical values, and the sample processing features. A label is a first sample abnormal result and a first sample confidence degree. The training data may be obtained based on historical data. The label of training data may be determined by manually labeling or automatically labeling. For example, the sub-platform may perform labeling by determining whether there is an abnormality in the upstream stage according to historical data.

In some embodiments of the present disclosure, the sub-platform determines the first abnormal result and the first confidence degree by processing the multiple groups of statistical values, the time intervals of the cycles corresponding to the multiple groups of statistical values, and processing features based on the long short-term memory. The sub-platform may determine whether the first abnormal result is credible based on the first abnormal result and the corresponding confidence degree, thereby judging whether the upstream stage is abnormal. Through the above judgment method, it is advantageous to improve the accuracy of determining whether the upstream stage is abnormal.

In some embodiments, when the first confidence degree is smaller than the threshold of the confidence degree, the sub-platform may determine the second abnormal result and the second confidence degree. Process 400 may also include step 430.

Step 430, reducing the first abnormal threshold when the first confidence degree is smaller than the threshold of the confidence degree; obtaining the new multiple groups of statistical values of the difference time based on the reduced first abnormal threshold; and determining the second abnormal result and the second confidence degree by processing the new multiple groups of statistical values, the time intervals of the cycles corresponding to the new multiple groups of statistical values, and processing features based on the long short-term memory.

The threshold of the confidence degree may refer to a lowest confidence degree of the credible abnormal results. For example, the threshold of the confidence degree may be 0.9 or 0.95, or the like. The threshold of the confidence degree may be preset by the sub-platform. The sub-platform may set the threshold of the confidence degree based on the actual needs.

In some embodiments, when the first confidence degree is smaller than the threshold of the confidence degree, the sub-platform may reduce the first abnormal threshold. For example, the first confidence degree is 0.7, the threshold of the confidence degree is 0.9, and the corresponding first abnormal threshold is 0.5. The first confidence degree 0.7 is smaller than the threshold of the confidence degree 0.9. The first abnormal threshold may be reduced from 0.5 to 0.4 by the sub-platform, and the first abnormal threshold after reduction is 0.4.

In some embodiments, the sub-platform may obtain the new multiple groups of statistical values of the difference time based on the first abnormal threshold after reduction. The new multiple groups of statistical values of the difference time may refer to the statistical values in a plurality of second preset time periods corresponding to the re-obtained abnormal classification result is based on the reduced first abnormal threshold. For example, the sub-platform may obtain a new classification result based on the first abnormal threshold after reduction (e.g. 0.4). Exemplary, the first abnormal threshold is 0.5, and the first abnormal threshold after reduction is 0.4. Abnormal predictive values between 0.4 and 0.5 are larger than the first abnormal threshold 0.4 after reduction. The sub-platform may re-obtain that a new classification result of the above plurality of second preset time periods is 1.

The sub-platform may obtain the maximum time and the minimum time of the corresponding plurality of second preset time periods based on the new classification result. The sub-platform may obtain a new difference time by calculating the difference value between the maximum time and minimum time. The sub-platform may obtain new multiple groups of statistical values of the difference times based on a plurality of new difference values of the time. In some embodiments, the sub-platform obtains new multiple groups of statistical values by reducing the first abnormal threshold. Comparing the amount of new multiple groups of statistical values obtained with the amount of original multiple groups of statistical values, the amount of new multiple groups of statistical values is larger than or equal to the amount of original multiple groups of statistical values.

In some embodiments, the sub-platform may input the new multiple groups of statistical values 431, the new time intervals 432 of the cycles corresponding to the multiple groups of statistical values, and processing features 423 or the like into the long short-term memory 424. Long short-term memory 424 outputs the second abnormal result 435 and the second confidence degree 436. For example, the long short-term memory outputs that the second abnormal result is 1, and the second confidence degree is 0.93. For more content about determining the second abnormal result and the second confidence degree, see step 420, here is not repeated.

Step 440, determining whether the upstream stage is abnormal by the sub-platform when the first confidence degree is larger than the threshold of confidence degree.

In some embodiments, when the first confidence degree is larger than the threshold of confidence degree, the sub-platform may determine whether the upstream stage is abnormal based on the first abnormal result. For example, the first abnormal result is 1, which indicates the upstream stage is abnormal; and the sub-platform may determine whether the upstream stage is abnormal based on the first abnormal result. As another example, the first abnormal result is 0, which indicates the upstream stage is normal; and the sub-platform may determine whether the upstream stage is normal based on the first abnormal result.

In some embodiments, when the second confidence degree is larger than the threshold of confidence degree, the sub-platform may determine whether the upstream stage is abnormal based on the second abnormal result. For example, a second abnormal result is 1, which indicates the upstream stage is abnormal, and the sub-platform may determine whether the upstream stage is abnormal based on the second abnormal result.

In some embodiments, when the second confidence degree is smaller than the threshold of confidence degree, the sub-platform may continue to reduce the first abnormal threshold that has been reduced, re-calculate and obtain new abnormal results and corresponding confidence degrees. A multi-cycle calculation may be performed until a confidence degree corresponding to a new abnormal result obtained is larger than the threshold of the confidence degree. The sub-platform may determine whether the upstream stage is abnormal based on the new abnormal result larger than the threshold of the confidence degree.

In some embodiments of the present disclosure, when the first abnormal result is low and not satisfied with the threshold of the confidence degree, the sub-platform may reduce the first abnormal threshold, and re-obtain new multiple groups of statistical values, the data amount of which is increased. Based on the new multiple groups of statistical values, the sub-platform obtains the second abnormal result and the second confidence degree. By increasing the amount of new multiple groups of statistical values, the sub-platform may improve the confidence degree of the output results of the long short-term memory, thereby further improving the accuracy of judging whether the upstream stage is abnormal.

Those skilled in the art may realize that the units and algorithm steps of each example described combined with the embodiments in the present disclosure may be implemented with electronic hardware, computer software or the combination of the two. To clearly explain the interchangeability of hardware and software, in the above description, the composition and steps of each example have been generally described according to the function. These functions are executed in hardware or software, depending on the specific application and design constraints of the technical solution. Professional technicians may use different methods to implement the described functions for each specific application, but this implementation should not be considered to exceed the scope of the present disclosure.

In several embodiments provided in the present disclosure, it should be understood that the disclosed devices and methods may be implemented in other ways. For example, the device embodiment described above is merely schematic. For example, the division of the unit is only a logic function division, and may have additional division during the actual implementation. For example, a plurality of units or components may be combined or integrated into another system, or some features may be ignored, or not executed. In addition, the coupling or direct coupling or communication connection displayed or discussed may be connected through indirect coupling or communication connection of some interfaces, devices, or units, and may also be connected through electric, mechanical or other forms.

The unit described as a separate part may be physical or not physical separation. Those skilled in the art may realize that the units and algorithm steps of each example described combined with the embodiments in the present disclosure may be implemented with electronic hardware, computer software or the combination of the two. To clearly explain the interchangeability of hardware and software, in the above description, the composition and steps of each example have been generally described according to the function. These functions are executed in hardware or software, depending on the specific application and design constraints of the technical solution. Professional technicians may use different methods to implement the described functions for each specific application, but this implementation should not be considered to exceed the scope of the present disclosure.

In addition, each functional unit in each embodiment of the present disclosure may be integrated into one processing unit, or physical existence alone, or two or more units integrated into one unit. The above-described integrated units may be implemented in the form of hardware or may be implemented in the form of a software functional unit.

The integrated unit may be stored in a computer readable storage medium if it is implemented in the form of a software functional unit and is sold or used as an independent product. Based on this understanding, the technical solution of the present disclosure is essentially contributed to existing technology, or all or part of the technical solution may be reflected in the form of software products. The computer software product is stored in a storage medium including several instructions to enable a computer device (may be a personal computer, server, or grid device, etc.) to perform all or part steps of the methods described in each embodiment of the present disclosure. The aforementioned storage medium includes all kinds of the medium that can store program code such as a U disk, a mobile hard disk, a read-only memory (ROM), a random access memory (RAM), a disk or disc, or the like.

The specific embodiments described above have further explained the purpose, technical solution, and beneficial effects of the present disclosure. It should be understood that the above-mentioned specifications are only the specific implementation methods of the present disclosure, not required to limit the protection scope of the present disclosure. Any modification, equivalent replacement, improvement, etc. in the spirit and principles of the present disclosure should be included within the protection range value of the present disclosure.

What is claimed is:

1. A system of an industrial internet of things with independent management platform, comprising: a user platform, a service platform, a management platform, a sensor network platform, and an object platform interacting in sequence; wherein:

the service platform and the sensor network platform both use a centralized arrangement, and the management platform uses an independent arrangement; the centralized arrangement means that a platform uniformly receives data, uniformly processes data, and/or uniformly sends data; the independent arrangement means that a platform uses different sub-platforms to store, process, and/or transmit different types of data;

the management platform comprises a plurality of sub-platforms; each of the sub-platforms corresponds to a type of a production line stage; the type of the production line stage comprises a first stage and a second stage associated with the first stage;

when the management platform receives sensing detection data transmitted by the object platform, the sensing detection data is presented to the user platform by the service platform after being processed by a sub-platform corresponding to the sensing detection data; and when the management platform sends a control command to the object platform, a control parameter of the type of the production line stage is calculated by a sub-platform corresponding to the type of the production line stage, and the control parameter is sent to the object platform as the control command.

2. The system of the industrial internet of things with independent management platform according to claim 1, wherein the first stage is a processing stage, the second stage is a material stage associated with the first stage; and the material stage comprises a feeding stage and a blanking stage.

3. The system of the industrial internet of things with independent management platform according to claim 2, wherein the sensing detection data received by the management platform comprises first data configured as a trigger time of material arrival of the feeding stage and second data configured as an amount of material arrival of the feeding stage; and when the control parameter of the type of the production line stage is calculated by a sub-platform corresponding to the type of the production line stage, a processing amount of the first stage is calculated according to a count of the first data and the second data received in a first preset time period, and a processing rate of the first stage is calculated as a control parameter of the first stage according to the processing amount.

4. The system of the industrial internet of things with independent management platform according to claim 3, wherein the sensing detection data received by the management platform further comprises third data configured as a trigger time of material discharge of the blanking stage and fourth data configured as an amount of material discharge of the blanking stage;

when the sub-platform receives the third data and the fourth data, an amount of material discharge of the blanking stage is calculated according to a count of the third data and the fourth data received in the first preset time period;

the sub-platform calibrates the processing amount of the first stage according to the amount of material discharge;

when calibrating, the sub-platform calculates a difference value between the amount of material discharge and the processing amount and judges that a production line is abnormal when the difference value exceeds a preset value; and when the production line is abnormal, the sub-platform reduces the processing rate of the first stage as the control parameter of the first stage and emits an abnormal notice to the user platform through the service platform.

5. The system of the industrial internet of things with independent management platform according to claim 3, wherein the sub-platform uses the first preset time period as a cycle to calibrate the second data;

when calibrating the second data, the sub-platform obtains a range value of the second data in the cycle, obtains first data corresponding to maximum second data corresponding to the range value as a maximum time when the range value exceeds a threshold, and obtains first data corresponding to minimum second data corresponding to the range value as a minimum time;

the sub-platform calculates a difference value between the maximum time and the minimum time as a difference time and calculates a ratio of the difference time to the cycle as a calibration ratio; and when the calibration ratio is smaller than a preset value, the sub-platform sends abnormal information of upstream production to the user platform through the service platform.

6. The system of the industrial internet of things with independent management platform according to claim 3, wherein the system of the industrial internet of things with independent management platform is configured to determine whether an upstream stage is abnormal, the first stage is a processing stage, and the upstream stage is a feeding stage, and the management platform is configured to perform the following operations including:

obtaining a statistical value of second data within at least one second preset time period, the statistical value including a range value, an average value, and a variance value of the second data;

determining an abnormal predictive value by processing the statistical value, a processing feature, and a cycle length based on an abnormal model;

obtaining a classification result based on a first abnormal threshold and the abnormal predictive value;

when the classification result is abnormal, first data corresponding to maximum second data corresponding to a maximum range value is obtained as a maximum time, and first data corresponding to minimum second data corresponding to a minimum range value is obtained as a minimum time; and the sub-platform calculates a difference value between the maximum time and the minimum time as a difference time and determines whether the upstream stage is abnormal based on the difference time.

7. The system of the industrial internet of things with independent management platform according to claim 6, wherein the management platform is configured to perform the following operations including:

obtaining multiple groups of statistical values of the difference time; and determining a first abnormal result and a first confidence degree by processing the multiple groups of statistical values, time intervals of a cycle corresponding to the multiple groups of statistical values, and a processing feature based on a long short-term memory, wherein the processing feature is used as a starting node to input the long short-term memory.

8. The system of the industrial internet of things with independent management platform according to claim 7, wherein the management platform is configured to perform the following operations including:

when the first confidence degree is smaller than a threshold of the confidence degree, reducing the first abnormal threshold;

obtaining new multiple groups of statistical values of the difference time based on the first abnormal threshold after reduction; and determining a second abnormal result and a second confidence degree by processing the new multiple groups of statistical values, new time intervals of the cycle corresponding to the multiple groups of statistical values, and the processing feature based on the long short-term memory.

9. A control method of industrial internet of things with independent management platform, which is implemented in a user platform, a service platform, a management platform, a sensor network platform, and an object platform interacting in sequence; wherein:

the service platform and the sensor network platform both use a centralized arrangement, and the management platform uses an independent arrangement; the centralized arrangement means that a platform uniformly receives data, uniformly processes data, and/or uniformly sends data; the independent arrangement means that a platform uses different sub-platforms to store, process, and/or transmit different types of data;

the management platform comprises a plurality of sub-platforms; each of the sub-platforms corresponds to a type of production line stage; the type of the production line stage comprises a first stage and a second stage associated with the first stage; and the control method comprises:

when the management platform receives sensing detection data transmitted by the object platform, presenting the sensing detection data to the user platform by the service platform after being processed by a sub-platform corresponding to the sensing detection data; and when the management platform sends a control command to the object platform, calculating a control parameter of the type of production line stage by a sub-platform corresponding to the type of the production line stage, and sending the control parameter to the object platform as the control command.

10. The control method of industrial internet of things with independent management platform according to claim 9, wherein the first stage is a processing stage, the second stage is a material stage associated with the first stage; and the material stage comprises a feeding stage and a blanking stage.

11. The control method of industrial internet of things with independent management platform according to claim 10, wherein the sensing detection data received by the management platform comprises first data configured as a trigger time of material arrival of the feeding stage and second data configured as an amount of material arrival of the feeding stage; and the control method further comprises:

when the control parameter of the type of the production line stage is calculated by a sub-platform corresponding to the type of the production line stage, calculating a processing amount of the first stage according to the count of the first data and the second data received in a first preset time period, and calculating a processing rate of the first stage as a control parameter of the first stage according to the processing amount.

12. The control method of industrial internet of things with independent management platform according to claim 11, wherein the sensing detection data received by the management platform further comprises third data configured as a trigger time of material discharge of the blanking stage and fourth data configured as an amount of material discharge of the blanking stage;

the control method further comprises:

when the sub-platform receives the third data and the fourth data, calculating an amount of material discharge of the blanking stage according to a count of the third data and the fourth data received in the first preset time period;

calibrating, by the sub-platform, the processing amount of the first stage according to the amount of material discharge;

when calibrating, calculating, by the sub-platform, a difference value between the amount of material discharge and the processing amount and judging that a production line is abnormal when the difference value exceeds a preset value; and when the production line is abnormal, reducing, by the sub-platform, the processing rate of the first stage as the control parameter of the first stage and emitting an abnormal notice to the user platform through the service platform.

13. The control method of industrial internet of things with independent management platform according to claim 11, wherein:

the sub-platform uses the first preset time period as a cycle to calibrate the second data;

when calibrating the second data, the sub-platform obtains a range value of the second data in the cycle, obtains first data corresponding to maximum second data corresponding to the range value as a maximum time when the range value exceeds a threshold, and obtains first data corresponding to minimum second data corresponding to the range value as a minimum time;

the sub-platform calculates a difference value between the maximum time and the minimum time as a difference time and calculates a ratio of the difference time to the cycle as a calibration ratio; and when the calibration ratio is smaller than a preset value, the sub-platform sends abnormal information of upstream production to the user platform through the service platform.

14. The control method of industrial internet of things with independent management platform according to claim 11, wherein the control method is used to determine whether an upstream stage is abnormal, the first stage is a processing stage, and the upstream stage is a feeding stage, and the method further comprises:

obtaining a statistical value of second data within at least one second preset time period, the statistical value including a range value, an average value, and a variance value of the second data;

determining an abnormal predictive value by processing the statistical value, a processing feature, and a cycle length based on an abnormal model;

obtaining a classification result based on a first abnormal threshold and the abnormal predictive value;

when the classification result is abnormal, obtaining first data corresponding to maximum second data corresponding to a maximum range value as a maximum time, and obtaining first data corresponding to minimum second data corresponding to a minimum range value as a minimum time; and calculating, by the sub-platform, a difference value between the maximum time and the minimum time as a difference time and determining whether the upstream stage is abnormal based on the difference time.

15. The control method of industrial internet of things with independent management platform according to claim 14, wherein the determining whether an upstream stage is abnormal based on the difference time comprises:

obtaining multiple groups of statistical values of the difference time; and determining a first abnormal result and a first confidence degree by processing the multiple groups of statistical values, time intervals of a cycle corresponding to the multiple groups of statistical values, and a processing feature based on a long short-term memory, wherein the processing feature is used as a starting node to input the long short-term memory.

16. The control method of industrial internet of things with independent management platform according to claim 15, wherein the method further comprises:
when the first confidence degree is smaller than a threshold of the confidence degree, reducing the first abnormal threshold;
obtaining new multiple groups of statistical values of the difference time based on the first abnormal threshold after reduction; and
determining a second abnormal result and a second confidence degree by processing the new multiple groups of statistical values, new time intervals of the cycle corresponding to the multiple groups of statistical values, and the processing feature based on the long short-term memory.

* * * * *